US012149442B1

(12) United States Patent
Ramachandra et al.

(10) Patent No.: US 12,149,442 B1
(45) Date of Patent: Nov. 19, 2024

(54) POLICY-BASED NETWORK TRANSMISSION ROUTING

(71) Applicant: Microsoft Technology Licensing, LLC, Redmond, WA (US)

(72) Inventors: Poornananda Gaddehosur Ramachandra, San Jose, CA (US); Ashish Bhargava, Sammamish, WA (US); Sumeet Mittal, Woodinville, WA (US); Sourav Das, Hyderabad (IN); Randy Miller, Newcastle, WA (US); Brian David Swander, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/326,235

(22) Filed: May 31, 2023

(51) Int. Cl.
*H04L 45/50* (2022.01)
*H04L 41/0894* (2022.01)
(Continued)

(52) U.S. Cl.
CPC .......... *H04L 45/48* (2013.01); *H04L 41/0894* (2022.05); *H04L 45/50* (2013.01); *H04L 45/74* (2013.01); *H04L 45/58* (2013.01)

(58) Field of Classification Search
CPC ..... H04L 45/48; H04L 45/74; H04L 41/0894; H04L 45/50; H04L 45/52; H04L 45/566; H04L 45/60
(Continued)

(56) References Cited

U.S. PATENT DOCUMENTS 6,680,912 B1 * 1/2004 Kalman ................ H04L 45/123
455/445
7,990,893 B1 * 8/2011 Singh ...................... H04L 45/04
370/254
(Continued)

FOREIGN PATENT DOCUMENTS

CA 2767499 A1 * 8/2012 ............ H04J 3/0641
CN 102238230 A * 11/2011 ......... H04L 12/4633
(Continued)

OTHER PUBLICATIONS

Graff, et al., "Filtering condition identifiers", Retrieved from: https://learn.microsoft.com/en-us/windows-hardware/drivers/network/filtering-condition-identifiers, Dec. 15, 2021, 13 Pages.
(Continued)

*Primary Examiner* — Khanh Q Dinh
(74) *Attorney, Agent, or Firm* — Holzer Patel Drennan (57) ABSTRACT

Policy-based network transmission routing is provided by accessing routing metadata in a wrapper of the transmission packet, the routing metadata representing a feature of the source or the destination, comparing the routing metadata to routing policy data associated with each of multiple routing policies defined within a routing policy structure, identifying, based on the comparing, one or more routing policies applicable to the transmission packet, identifying, based on the routing policy data, a highest priority routing policy from the one or more routing policies, the highest priority routing policy defining a route constraint usable to limit a selection of available routes to the destination, and selecting the route from the available routes based on the route constraint.

17 Claims, 5 Drawing Sheets

(51) Int. Cl.
*H04L 45/48* (2022.01)
*H04L 45/74* (2022.01)
*H04L 45/58* (2022.01)

(58) Field of Classification Search
USPC ............... 709/220, 224, 225, 228, 226, 227
See application file for complete search history.

(56) References Cited

U.S. PATENT DOCUMENTS

| | | | |
|---|---|---|---|
| 2005/0078672 A1* | 4/2005 | Caliskan | H04W 88/02 |
| | | | 370/389 |
| 2006/0007945 A1* | 1/2006 | Schoettle | G08B 21/22 |
| | | | 370/401 |
| 2006/0251087 A1* | 11/2006 | Ng | G06F 13/387 |
| | | | 370/401 |
| 2007/0036180 A1* | 2/2007 | Shenoi | H04J 3/0632 |
| | | | 370/235 |
| 2007/0041324 A1* | 2/2007 | Shenoi | G06F 5/14 |
| | | | 370/235 |
| 2011/0243065 A1* | 10/2011 | Sarma | H04W 40/248 |
| | | | 370/328 |
| 2015/0350071 A1 | 12/2015 | Pauly | |
| 2021/0407314 A1* | 12/2021 | Sivaratri | G09B 9/304 |
| 2022/0060449 A1* | 2/2022 | Head, Jr. | H04L 63/029 |
| 2022/0060498 A1* | 2/2022 | Head, Jr. | H04L 12/4641 |
| 2022/0210225 A1* | 6/2022 | Shilimkar | H04L 12/4641 |
| 2022/0337557 A1* | 10/2022 | Head | H04L 63/0245 |

FOREIGN PATENT DOCUMENTS

| | | | | |
|---|---|---|---|---|
| CN | 107455004 A | * | 12/2017 | ............. H04L 45/00 |
| EP | 3355526 A1 | | 8/2018 | |

OTHER PUBLICATIONS

Graff, et al., "What is Modern Standby", Retrieved from: https://learn.microsoft.com/en-us/windows-hardware/design/device-experiences/modern-standby, Mar. 3, 2021, 4 Pages.

White, et al., "About the Wi-Fi Direct feature", Retrieved from: https://learn.microsoft.com/en-us/windows/win32/nativewifi/about-the-wi-fi-direct-api, Jun. 20, 2022, 3 Pages.

International Search Report and Written Opinion received for PCT Application No. PCT/US2024/030187, Aug. 21, 2024, 18 pages.

* cited by examiner

POLICY-BASED NETWORK TRANSMISSION ROUTING

BACKGROUND

Common data transmission protocols provide for transferring data over networks in packets. A data packet typically includes a header and a payload. The payload is a portion of the packet with the data that is packetized for transmission. The header is a portion of the packet that includes metadata describing the route of the packet through a network. In some systems, the packets are routed from a transmission source to a transmission destination based on data stored in the metadata in the header.

SUMMARY

The presently disclosed technology provides policy-based network transmission routing based on routing metadata extracted from a wrapper of a transmission packet. The routing metadata represents a feature of the source or the destination, and the routing metadata is compared to routing policy data associated with each of multiple routing policies defined within a routing policy structure. Based on the comparing, one or more routing policies applicable to the transmission packet are identified, and a highest priority routing policy is selected from the one or more applicable routing policies. The highest priority routing policy defines a route constraint usable to limit a selection of available routes to the destination. The route is selected from the available routes based on the route constraint.

This summary is provided to introduce a selection of concepts in a simplified form. The concepts are further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTION

A transmission source is configured to execute a routing pipeline, which is a sequence of operations that determine a transmission route a packet will take from a transmission source to a transmission destination. At a routing point in the routing pipeline, a transmission source determines routing data describing the route of the packet. Examples of routing data include a source interface (e.g., a network interface controller or card) of a transmission source, a source Internet protocol (IP) address of a transmission source, or a next hop IP address of a router in the network through which the packet is to be transmitted. The transmission source references one or more routing data structures and uses the metadata from the packet header to determine the routing data, which ultimately facilitates the selection of a route from multiple routes defined in the routing data structure(s) for the packet to traverse the network. However, relying on the metadata in the packet header alone to determine routing data limits the control a transmission source exerts over the routing of a packet. For example, existing transmission systems lack controls for the transmission source to determine a source IP address from which a packet is transmitted.

In the presently disclosed technology, the transmission source references routing policy data structure(s) to determine a routing policy (e.g., a routing constraint) to control the route a packet takes through the network. The transmission source references the routing policy data structure(s) at a policy inspection point in the routing pipeline prior to the routing point to determine the route. The transmission source references the routing data structure(s) at the routing point in the routing pipeline based on the determined routing policy and metadata in the packet header. The routing policy enables the transmission source to further refine the determination of the routing data by setting routing constraint(s) on routes identified in the routing data structure that are available for transmitting the packet. In various implementations, routing constraints are effective in constraining the selection of a specific source IP address of the transmission source, in constraining the selection of a specific interface in the transmission source, or to select a specific router in the network through which the packet is transmitted. Limiting routes available to a packet using policies provides the transmission source better control over the routes packets take through the network.

In one implementation, the transmission source or other source computing device generates a wrapper containing or encompassing the packet. The wrapper includes types of routing metadata that are not redundantly represented in the packet header. Examples of metadata parameters of the routing metadata included in the wrapper include a transmission destination feature, such as a hostname of the transmission destination, or a transmission source feature, such as a process identifier of a process associated in memory with the transmission packet, a user identifier of a user associated in memory with the transmission packet, or a compartment identifier of a compartment (e.g., a namespace, container, or virtual machine) in the transmission source or source computing device from which the transmission packet is sourced. Incorporating routing metadata from a wrapper around a transmission packet into the process of selecting routing policies provides a transmission source with an added measure of control over the routing of a packet through a network.

Figure 1:
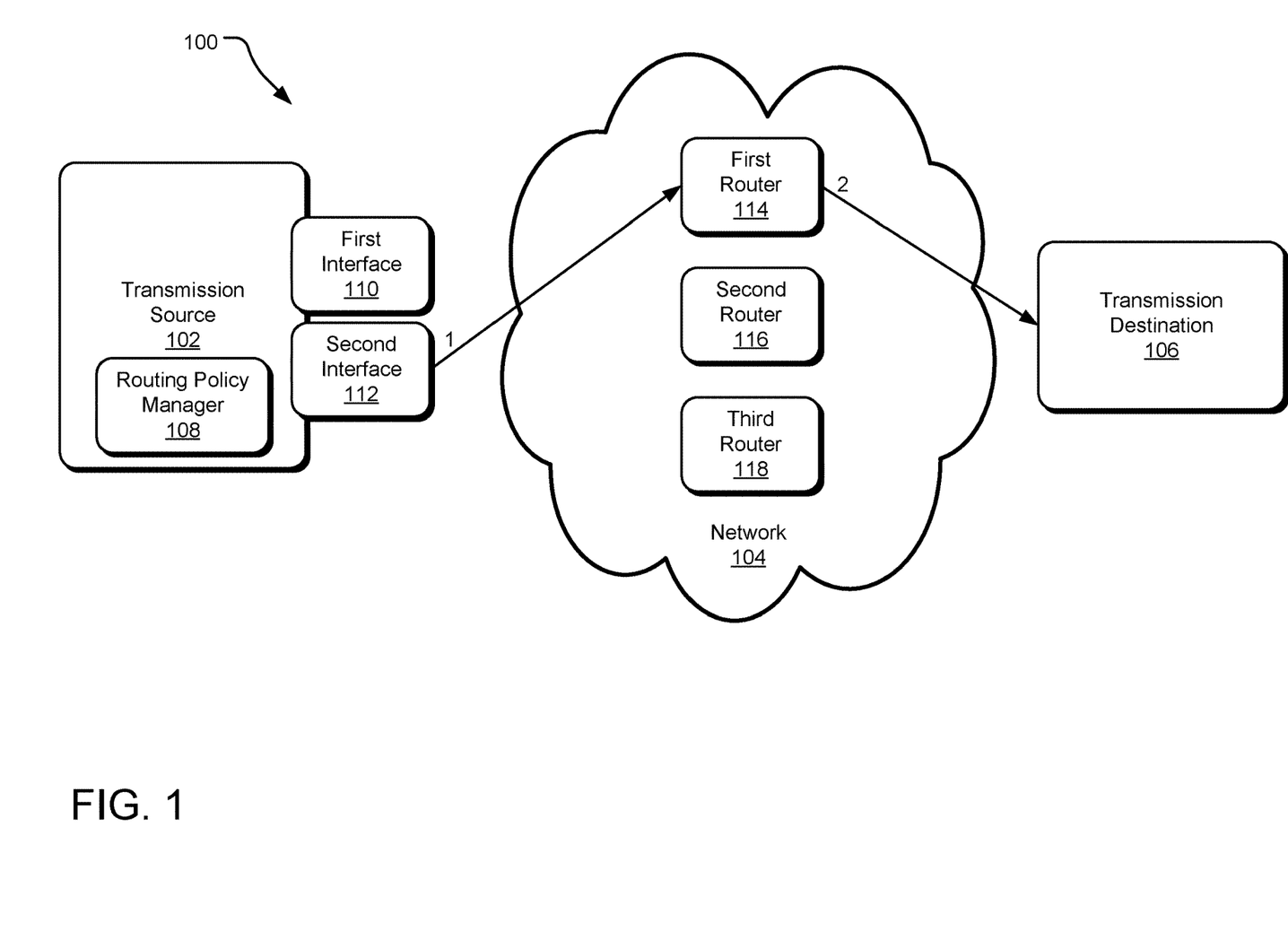
FIG. 1 illustrates an example system configured to route packets through a network by policy-based network transmission routing.

FIG. 1 illustrates an example system 100 configured to route packets through a network 104 by policy-based network transmission routing. A transmission source 102 transmits packets to a transmission destination 106 via the network 104 (e.g., a cloud network). The transmission source 102 follows a routine referred to herein as a routing pipeline to route the packets from the transmission source 102 to the transmission destination 106. At a routing point in the routing pipeline, the transmission source 102 references one or more routing data structures to determine routing data used to define the route a packet (e.g., a transmission packet) will take. As used herein, the term "policy inspection point" refers to a point in the routing pipeline prior to the routing point that serves as a trigger for selecting routing policies to be applied when subsequently selecting the route at the routing point. The transmission source 102 determines the routing data from the routing data structure(s) based on metadata stored in a packet header in the packet.

In implementations, as a packet leaves a socket in the transmission source 102 or another source computing device, a kernel networking stack forms a wrapper around the packet. The wrapper includes data external to the packet. The wrapper includes data fields for metadata that differ from data fields in a header within the packet. As the packet progresses through the transmission pipeline, data is added to the fields in the header of the packet. When the packet is ready for transmission, the wrapper is removed, and the packet is transmitted without the wrapper. In various implementations, the metadata of either the wrapper or the packet header can be used in selecting routing policies that guide the selection of a final route along which to direct the packet to the transmission destination 106. Examples of this policy-based routing are discussed in detail below.

The transmission source 102 includes a routing policy manager 108. At the policy inspection point, a routing policy manager 108 determines whether to apply a routing policy, which generally refers to one or more routing constraints that limit the selection of the route. The routing policy manager 108 accesses and/or extracts routing metadata from the wrapper that encompasses the packet to be transmitted. In various implementations, routing data in the packet header differs from routing metadata in the wrapper. Example types of routing metadata in the wrapper that are not found in the data packet header (e.g., not transmitted along with the data) include a source process identifier, a compartment identifier, a user identifier, or a destination host identifier. In various implementations, one or more of these types of routing metadata are used in selecting a routing policy. The routing policy manager 108 is configured to limit routes available to the packet based on routing policy data in a routing policy data structure (also referred to as a routing policy structure) and based on the accessed or extracted routing metadata from the packet wrapper containing the packet to be transmitted.

The routing policy manager 108 determines the routing policy by comparing the routing metadata from the wrapper (e.g., external to the packet itself) with routing policy data associated with each of multiple routing policies defined within a routing policy structure. For example, the routing manager determines whether routing metadata parameter values match or otherwise satisfy metadata conditions associated in the routing policy data structure with the routing policies. The routing policy manager 108 then identifies, based on the comparison, one or more routing policies applicable or available to the packet. The routing policy manager 108 then identifies, based on the routing policy data, a highest priority routing policy from the one or more routing policies. When more than one routing policy is applicable to the packet (e.g., based on the routing data), the routing policy manager 108 identifies the highest priority routing policy based on ranked prioritization data of the routing policy data associated with each routing policy in the routing policy data structure.

In an implementation, the routing policies constrain values of routing parameters of the route (e.g., as expressed in routing data for routing the packet). Examples of routing parameters include the source IP address, the source interface, or the next hop IP address. By way of example, a routing policy could limit available routes for a packet to a first interface 110 (e.g., a network interface controller in the transmission source 102) to the exclusion of a second interface 112 by limiting the source interface routing parameter value to a value identifying the first interface 110.

A routing manager selects a route for the packet from among routes represented in a routing data structure based on the identified routing policy. The identified routing policy defines at least one constraint that limits routes available to the packet among the routes represented in the routing data structure. Based on the identified routing policy and the routing metadata from the packet wrapper, the routing policy manager 108 selects the highest priority route of the available routes available after the constraint is applied. In an implementation, the routes represented in the routing policy data structure are ranked by a predefined priority in the routing data structure to choose among routes available after the routing manager applies the constraint of the routing policy.

The first interface 110 and the second interface 112 are hardware elements (e.g., network interface controllers) in the transmission source 102 through which packets are transferred to the network 104. The network 104 includes a first router 114, a second router 116, and a third router 118, one of which is selectable for routing a packet between the transmission source 102 and the transmission destination 106. The routing data that the transmission source 102 determines by referencing the routing data structure includes a source interface, which identifies by which of the first interface 110 and the second interface 112 the packet is transmitted to the network. The source interface is an outgoing interface through which outgoing packets are transmitted. Arrows in FIG. 1 are denoted with numbers 1-2 to indicate an order of communications described below. In the illustrated implementation, the routing data includes a source interface routing parameter value identifying the second interface 112. Accordingly, the packet is routed through the second interface 112 in communication 1 to the network 104.

The routing data further includes a next hop IP address routing parameter value that identifies the first router 114 as the next destination for the packet. Accordingly, the packet is next transmitted to the first router 114 from the second interface 112. The routing data includes data representing the transmission destination 106 to which the packet is transmitted in communication 2 from the first router 114. The routing data also includes a source IP address of the transmission source 102. In implementations, the source IP address is one of a plurality of source IP addresses available to the transmission source 102 from which the packet is transmittable. In these implementations, the routing policy manager 108 is configurable to use a routing policy to constrain the routing data to a source IP address routing parameter values representing one of the source IP addresses available to the transmission source 102.

The policy inspection point (e.g., the point in the routing pipeline at which applicable routing policies are determined) is positionable at any point in the routing pipeline after the destination IP address is determined for the packet. For example, the policy inspection point is positioned at a point in the routing pipeline prior to a path cache operation or a route lookup operation. Other examples of policy inspection points include a point within an application layer enforcement shim, a portion of the routing pipeline within a transport layer, a portion of the routing pipeline within a network layer, or other positions in the routing pipeline after a destination IP address is determined but before route lookup begins.

In sum, the routing policy manager 108 of the presently disclosed technology extracts routing metadata from the wrapper of the data packet, which includes routing metadata not found in the packet itself (e.g., not found in a packet header). The routing policy manager 108 uses the extracted routing metadata to select one or more routing policies that are, in turn, used to limit the selection of the route that the data packet ultimately traverses from the transmission source 102 to the transmission destination 106. The extracted routing metadata provides the routing policy manager 108 with added data to flexibly determine applicable routing policies and control which routes are available to the packet. The flexibility to impose routing policies based on packet metadata is beneficial in a number of different scenarios. In a first scenario, the transmission source 102 can control the source IP addresses to isolate transmissions for users of a service to a first source IP address and isolate transmissions for backend support to a second source IP address. In a second scenario, the transmission source 102 provides different levels of service and provides users with enhanced subscriptions that include more powerful network interfaces (e.g., higher-end or dedicated network interface controllers) by which to transmit the packets. In a third scenario, a user may impose geographic limitations on where the packet is allowed to be transmitted, and the routing policies can be used to direct the packet to routers with next hop IP addresses that are located within a specific geographic region. These are merely example scenarios, and other scenarios are contemplated.

Figure 2:
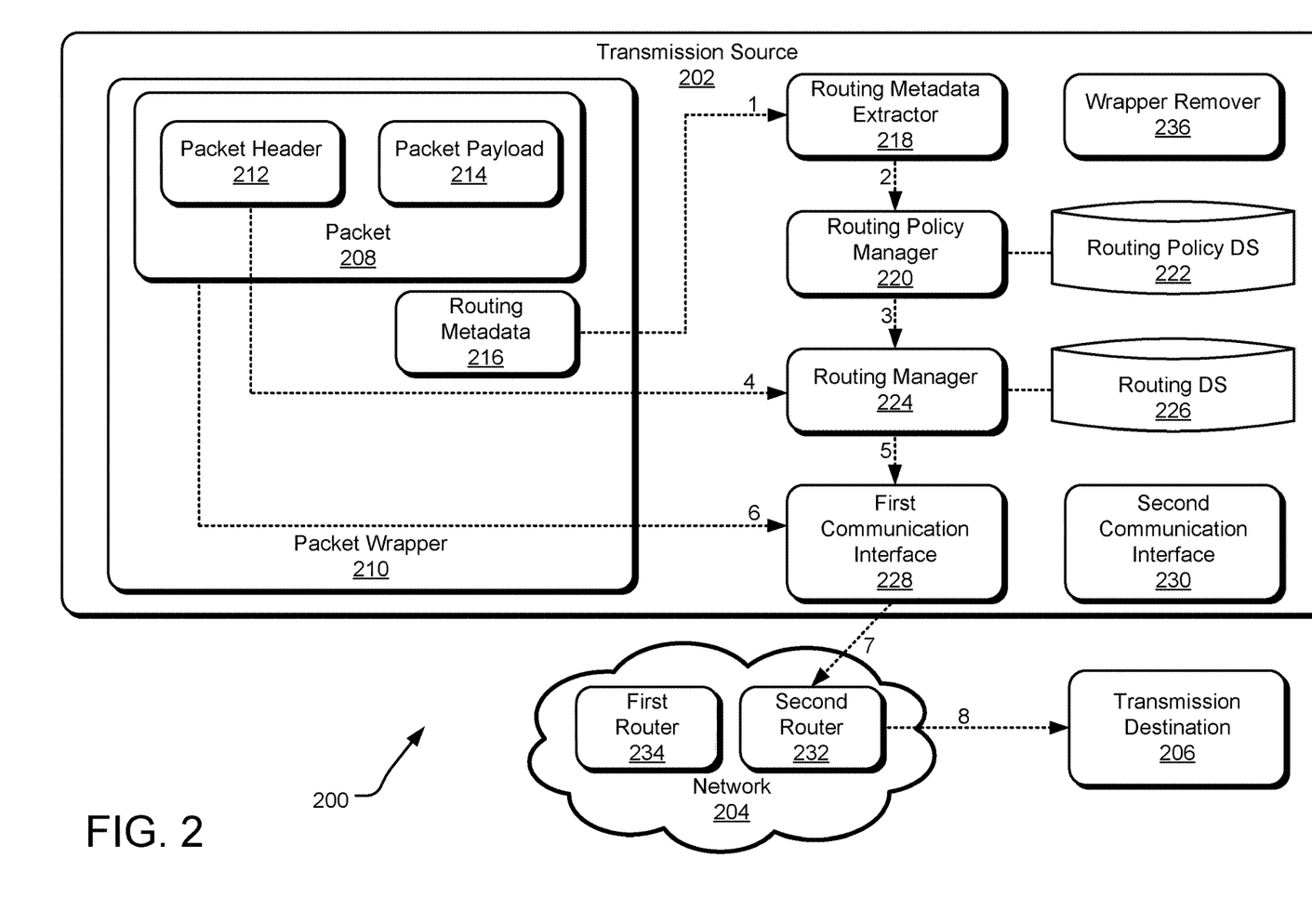
FIG. 2 illustrates another example system configured to route packets through a network by policy-based network transmission routing.

FIG. 2 illustrates another example system 200 configured to route packets through a network 204 by policy-based network transmission routing. The transmission source 202 is configured to determine routing data for routing a packet 208 from the transmission source 202, through the network 204 and to a transmission destination 206. The transmission source 202 (or other computing device source) generates a packet 208 contained within a packet wrapper 210. The packet includes a packet header 212 with metadata and a packet payload 214 with the data to be transmitted. The wrapper further includes routing metadata 216. The routing metadata 216 includes metadata different from the metadata in the packet header 212. Examples of metadata parameters, the values of which are accessible or extractable from the routing metadata 216, include a transmission destination feature, such as a hostname of the transmission destination 206, or a transmission source feature, such as a process identifier of a process (e.g., in the transmission source 202 or another source computing device) associated in memory with the packet 208, a user identifier of a user associated in memory with the packet 208, or a compartment identifier of a compartment (e.g., a namespace, container, or virtual machine) in the transmission source 202 or source computing device from which the packet 208 is sourced.

Arrows in FIG. 2 are denoted with numbers 1-8 to indicate an order of communications described below. The routing policy manager 220 identifies that a policy inspection point in the routing pipeline has been reached. In response to the identification of the policy inspection point, in communication 1, the routing metadata extractor 218 extracts or accesses the routing metadata 216 from the packet wrapper 210. In communication 2, the extracted or accessed routing metadata is transmitted to a routing policy manager 220. The routing policy manager 220 references routing policy data in a routing policy data structure 222 and determines, based on the routing metadata 216 extracted or accessed and the routing policy data, a routing policy from multiple routing policies provided in the routing policy data structure 222. The determination includes a comparison of the routing metadata with metadata conditions for each policy. Based on the comparison, the routing policy manager 220 identifies available policies for the packet based on the comparison. When more than one routing policy is available, the routing policy manager 220 then identifies the highest priority routing policy of the available routing policies available based on ranked prioritization data that prioritizes the routing policies in the routing policy data structure 222. In the illustrated implementation, the identified routing policy includes routing constraints that limit routes available to the packet 208 to routes with routing parameter values representing a first communication interface 228 and a next hop IP address of a second router 232. In communication 3, the determined highest priority routing policy is transmitted to a routing manager 224.

In communication 4, the routing manager 224 retrieves metadata from the packet header 212 to be used in a determination of a route for the packet. In implementations in which metadata from the packet header is not used to determine a route, communication 4 is omittable. The routing manager 224 references a routing data structure 226 and determines available routes for the packet to take based on the determined routing policy and the metadata retrieved from the packet header 212 (if applicable). In the illustrated example, the routing policy will constrain the available routes to ones that pass through the first communication interface 228 and to a next hop IP address of the second router 232. The constraints eliminate a second communication interface 230 and a first router 234 as options for transmitting the packet 208. In an implementation, the available routes are ranked by priority in the routing data structure 226, and the routing manager 224 is configured to generate routing data representing the route with the highest priority when more than one route that satisfies the routing policy is available. In communication 5, the transmission source 202 receives the generated routing data representing the route the packet 208 will take.

In implementations, a wrapper remover 236 is used to remove the packet wrapper 210 of the packet 208 prior to transmission. In communication 6, the packet 208 without the packet wrapper 210 is transmitted to the first communication interface 228 based on the value of the routing parameter representing the first communication interface 228 in the routing data. The packet is also transmitted from a source IP address represented by a value of a source IP address routing parameter value in the routing data. In communication 7, the packet is transmitted to the second router 232 based on the next hop IP address routing parameter value in the routing data. In communication 8, the packet is further transmitted to the transmission destination 206 based on the routing data.

Figure 3:
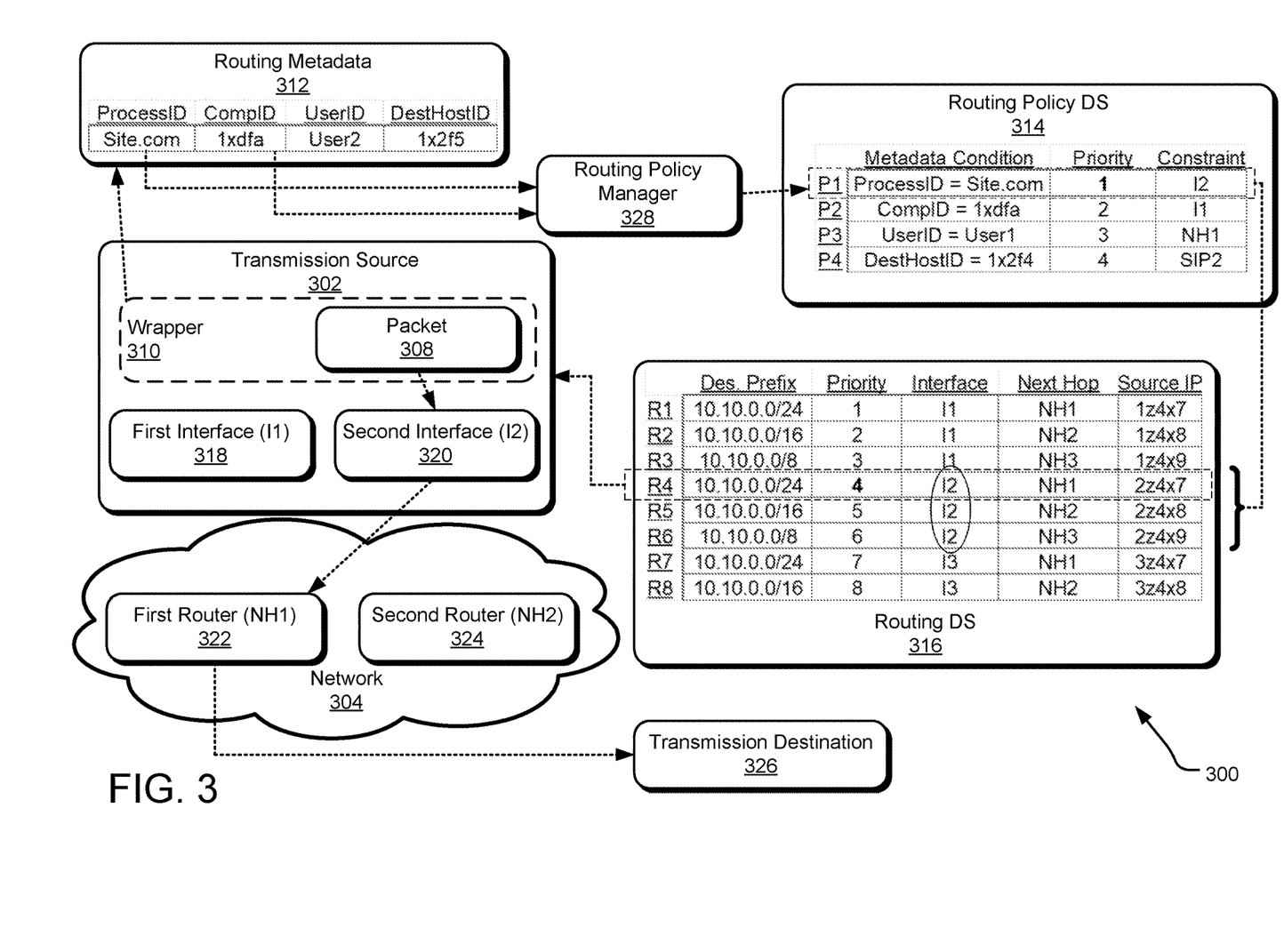
FIG. 3 illustrates an example routing pipeline using policy-based network transmission routing.
Figure 4:
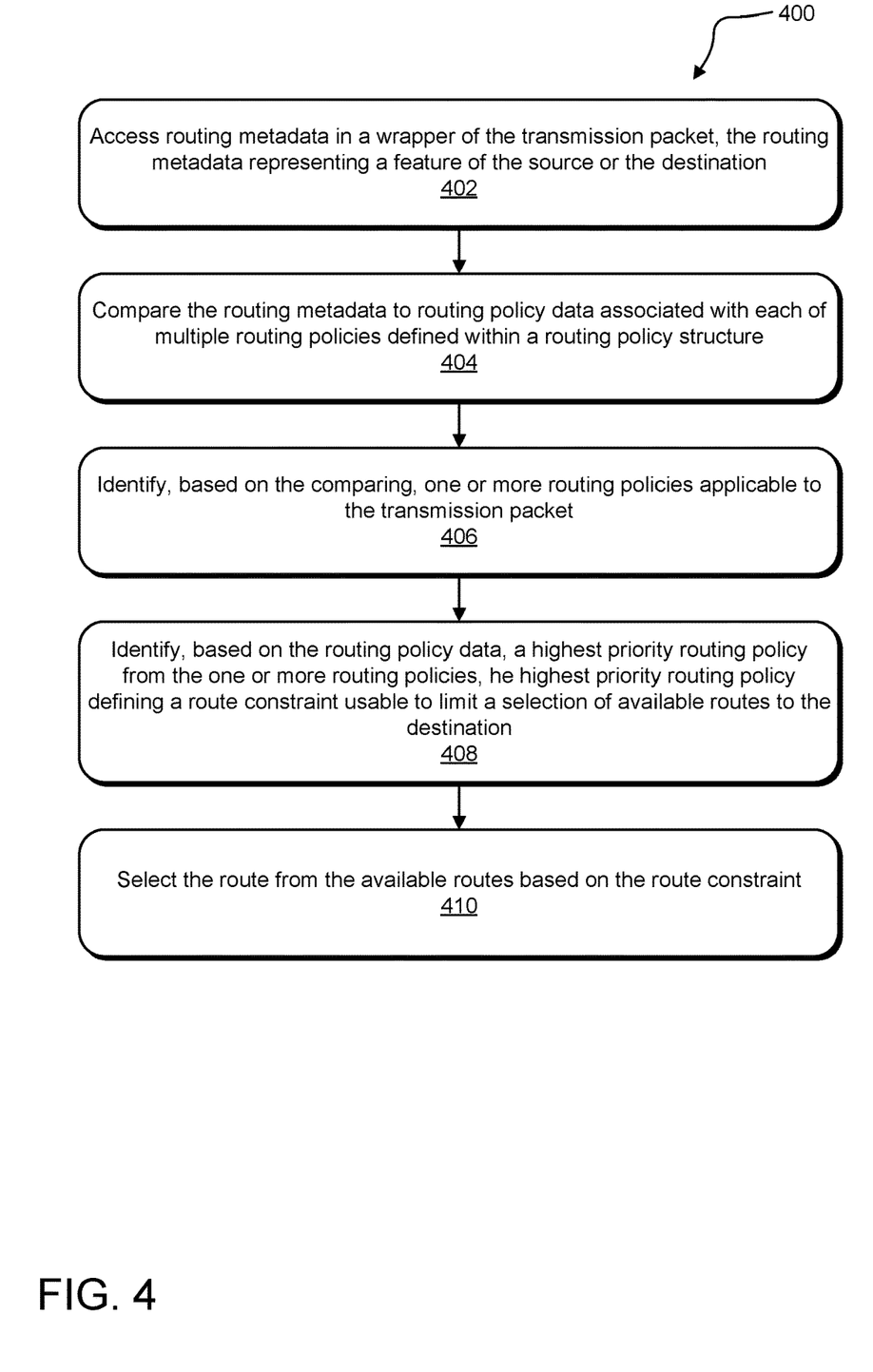
FIG. 4 illustrates example operations for policy-based network transmission routing of a packet.

FIG. 3 illustrates an example routing pipeline 300 that incorporates policy-based network transmission routing. A transmission source 302 or other source computing device generates a packet 308 contained within a wrapper 310 (e.g., a packet wrapper). A routing policy manager 328 identifies that a policy inspection point in the routing pipeline 300 has been reached. At the policy inspection point, routing metadata 312 is extracted from the data packet and/or from the data packet wrapper 310. In the example of FIG. 4, the routing metadata 312 includes metadata values of "Site.com," "1xfda," "User2," and "1x215" of the metadata parameters "ProcessID," "CompID" (e.g., a compartment identifier), "UserID," and "DestHostID" (e.g., a destination host identifier), respectively. Although illustrated as data in the wrapper 310 external to the packet 308, it should be appreciated that the routing metadata 312 could further include metadata from the packet 308 header, which may be considered in conjunction with the routing metadata 312 from the wrapper 310 when determining an applicable policy.

The routing policy manager 328 references a routing policy data structure 314 and determines, based on the routing metadata 312, an applicable policy. In the event that more than one policy is applicable, the routing policy manager 328 identifies a highest priority applicable policy. In the routing policy data structure 314, there are four example policies shown. Each of the policies defines a constraint (e.g., the last column) that is to be used to limit route selection.

In the specific example shown, the policies in the routing policy data structure 314 are ranked based on priority. The routing policy manager 328 first compares the routing metadata 312 with a metadata condition defined in association with each routing policy to identify one or more applicable routing policies.

In the example shown, two of the four policies are applicable routing policies with a metadata condition matching a metadata value included in the routing metadata 312. Specifically, the routing metadata 312 includes a "ProcessID" value of "Site.com" corresponding to a policy metadata condition of the first routing policy P1 with the highest priority of one. The first routing policy P1 includes the constraint "I2," indicating that the route chosen should be limited to a route using a second interface 320 and not a first interface 318 of the transmission source 302. In the illustrated example, the routing metadata 312 also includes a "CompID" value of "1xdfa," which corresponds to a policy metadata condition of a second routing policy P2 with a second highest priority of two. The second routing policy P2 includes a constraint that constrains available routes to routes through the first interface 318. The routing policy manager 328 will identify the first and second routing policies as applicable based on the satisfaction of the metadata conditions associated with the first and second routing policies. However, the routing policy manager 328 identifies the first routing policy as the highest priority routing policy because the first routing policy P1 is ranked with a higher priority than the second routing policy P2.

Although not invoked in the above example, the third routing policy P3 imposes a constraint that the packet 308 is transmitted through the first router 322, represented as "NH1" in the routing policy data structure, and the fourth routing policy P4 limits the source IP address of the packet 308 to a second IP address (e.g., presented in a different source IP address data structure not illustrated) of the transmission source 302 represented as "SIP2" in the routing policy data structure.

After the applicable, highest-priority routing policy is selected from the routing policy data structure 314, a route for the packet 308 is selected based on the selected policy (P1). In the above example, the selected routing policy P1 imposes a constraint "I2" that limits route selection to a subset of routes that include the second interface 320. A routing manager (not shown) identifies a subset of the routes in a routing data structure 316 that satisfy the constraint (I2) of the selected policy (P1). In the example shown, there are three routes that go through the second interface (illustrated with a circle) and that therefore satisfy the constraint defined by the selected routing policy P1. The routing manager determines, based on the first routing policy P1 and priority data in the routing data structure 316, a highest-priority available route for the packet 308 (e.g., selected from the subset of identified routes that satisfy the constraint(s) defined by the selected routing policy P1. In an implementation, the available routes are ranked based on the length of the destination prefixes of the routes. For example, the priority is higher for longer destination prefixes.

Returning to the illustrated example, the routing manager selects R4 as the highest priority route because R4 is the highest-priority route that is available among the subset of routes that satisfy the constraint (I2) of the selected routing policy (P1). The routing data in R4 is at least partially defined by routing parameter values of "I2," "NH1," and "2z4x7" of the routing corresponding parameters interface, next hop IP address, and source IP address, respectively. The R4 policy instructs that the transmission source 302 is to transmit the packet 308 through the first router 322 (with a first next hop IP address ("NH1") as opposed to a second router 324 identifiable by a second next hop IP address (NH2). The R4 policy instructs the transmission source 302 to transmit the packet from a source IP address of "2z4x7." In accordance with the routing data, the transmission source 302 removes the packet 308 from the wrapper 310 and transmits the packet 308 using a source IP address of "2z4x7" from the second interface 320, through the first router 322 in the network 304, and to the transmission destination 326.

FIG. 4 illustrates example operations 400 for policy-based network transmission routing of a packet.

An accessing operation 402 accesses and/or extracts the routing metadata in a wrapper of the packet. The routing metadata represents a feature of the source or the destination. The packet includes a header and a payload. The routing metadata from the wrapper includes data different from metadata in the header of the packet to be transmitted. The different data is usable by the transmission source to control the routing of the packet. The routing metadata includes values of metadata parameters, such as a hostname of the destination, a process identifier of a process associated with the transmission packet, a user identifier of a user associated with the transmission packet, or a compartment identifier of a namespace from which the transmission packet is sourced.

In an implementation, the accessing operation 402 is conducted in response to an identifying operation (not illustrated) that identifies that a policy inspection point in the routing pipeline by which outgoing packets are routed has been reached, as described herein. Examples of policy inspection points include a point within an application layer enforcement shim, a portion of the routing pipeline within a transport layer, a portion of the routing pipeline within a network layer, or other positions in the routing pipeline after a destination IP address is determined but also before route lookup begins.

A comparing operation 404 compares the routing metadata to routing policy data associated with each of multiple routing policies defined within a routing policy data structure. The routing policy structure includes multiple routing policies. The routing policies include constraints on the available routes for the packet through the network. The comparison includes comparing metadata parameters of the routing metadata from the wrapper with metadata conditions expressed in the policy routing data structure.

An identifying operation 406 identifies, based on the comparing operation 404, one or more routing policies applicable or corresponding to the transmission packet. The identifying operation 406 identifies policies in the routing policy data structure that correspond to the routing metadata from the wrapper.

An identifying operation 408 identifies, based on the routing policy data, a highest priority routing policy from the one or more routing policies. The highest priority routing policy defines a route constraint usable to limit a selection of available routes to the destination. The routing policy data structure includes data representing a ranked prioritization of the policies. Of the policies identified as corresponding to the routing metadata of the wrapper, the identifying operation identifies the policy with the highest priority to be used to constrain a selection of routes in a routing data structure available to the packet. In an implementation, the route constraint defines at least one of a source interface, a source internet protocol (IP) address, and a next hop address of the route.

A selecting operation 410 selects the route from the available routes based on the route constraint. The selecting operation 410 uses a routing manager to reference the routing data structure and determine available routes for the transmission packet. When more than one route is available after applying the constraint, the routing manager determines a highest priority route from the available routes based on data representing ranked prioritization of the routes in the routing data structure. In an implementation, the selected route includes a source interface, a source Internet protocol (IP) address, or a next hop address defined in the constraint. The routing manager generates routing data, including routing parameter values of the source interface, the source Internet protocol (IP) address, or the next hop address of the selected route. The generated routing data is useable by the transmission source to route the data.

In implementations, the operations 400 further include a removing operation (not illustrated) that removes, responsive to the selecting operation 410, the wrapper from the transmission packet and/or a transmitting operation (not illustrated) that transmits the transmission packet along the route with the wrapper removed.

Figure 5:
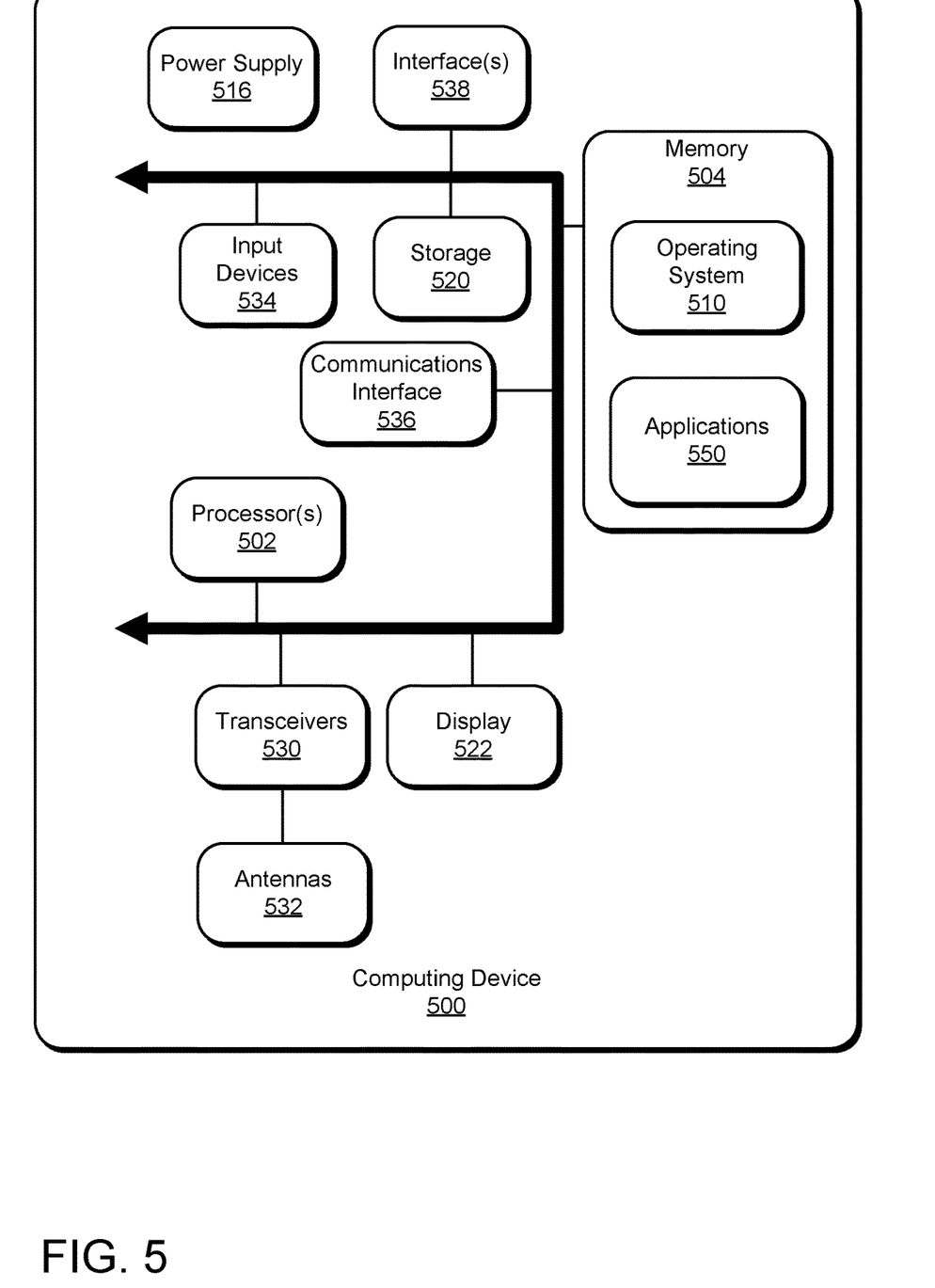
FIG. 5 illustrates an example computing device for use in implementing the described technology.

FIG. 5 illustrates an example computing device 500 for use in implementing the described technology. The computing device 500 may be a client computing device (such as a laptop computer, a desktop computer, or a tablet computer), a server/cloud computing device, an Internet-of-Things (IoT), any other type of computing device, or a combination of these options. The computing device 500 includes one or more processor(s) 502 and a memory 504. The memory 504 generally includes both volatile memory (e.g., RAM) and nonvolatile memory (e.g., flash memory), although one or the other type of memory may be omitted. An operating system 510 resides in the memory 504 and is executed by the processor(s) 502. In some implementations, the computing device 500 includes and/or is communicatively coupled to storage 520.

In the example computing device 500, as shown in FIG. 5, one or more modules or segments, such as applications 550, a routing metadata extractor, a routing policy manager, a routing manager, a wrapper remover, a routing pipeline, and other program code and modules are loaded into the operating system 510 on the memory 504 and/or the storage 520 and executed by the processor(s) 502. The storage 520 may store a packet, a packet header, a packet payload, routing metadata, a packet wrapper, a routing policy datastore, a routing datastore, a metadata parameter, a value of a metadata parameter, a routing parameter, a routing parameter value, a routing point, a policy inspection point, and other data and be local to the computing device 500 or may be remote and communicatively connected to the computing device 500. In particular, in one implementation, components of a system for routing a transmission packet along a route from a source to a destination include one or more hardware processors, a routing metadata extractor configured to extract routing metadata from a wrapper of the transmission packet, a routing policy manager configured to compare the routing metadata to routing policy data associated with each of multiple routing policies defined within a routing policy structure, identify one or more routing policies applicable to the transmission packet, and identify, based on the routing policy data, a highest priority routing policy from the one or more routing policies, the highest priority routing policy defining a route constraint usable to limit a selection of available routes to the destination. The system may further include a routing manager configured to select the route from the available routes based on the route constraint. The system may be implemented entirely in hardware or in a combination of hardware circuitry and software.

The computing device 500 includes a power supply 516, which may include or be connected to one or more batteries or other power sources, and which provides power to other components of the computing device 500. The power supply 516 may also be connected to an external power source that overrides or recharges the built-in batteries or other power sources.

The computing device 500 may include one or more communication transceivers 530, which may be connected to one or more antenna(s) 532 to provide network connectivity (e.g., mobile phone network, Wi-Fi®, Bluetooth®) to one or more other servers, client devices, IoT devices, and other computing and communications devices. The computing device 500 may further include a communications interface 536 (such as a network adapter or an I/O port, which are types of communication devices). The computing device 500 may use the adapter and any other types of communication devices for establishing connections over a wide-area network (WAN) or local-area network (LAN). It should be appreciated that the network connections shown are exemplary and that other communications devices and means for establishing a communications link between the computing device 500 and other devices may be used.

The computing device 500 may include one or more input devices 534 such that a user may enter commands and information (e.g., a keyboard, trackpad, or mouse). These and other input devices may be coupled to the server by one or more interfaces 538, such as a serial port interface, parallel port, or universal serial bus (USB). Other interfaces may include a sensor or an actuator. The actuator may be configured to move responsive to the sensors (e.g., in a feedback loop) and may be used to execute any operations described herein. The computing device 500 may further include a display 522, such as a touchscreen display.

The computing device 500 may include a variety of tangible processor-readable storage media and intangible processor-readable communication signals. Tangible processor-readable storage can be embodied by any available media that can be accessed by the computing device 500 and can include both volatile and nonvolatile storage media and removable and non-removable storage media. Tangible processor-readable storage media excludes intangible communications signals (such as signals per se) and includes volatile and nonvolatile, removable and non-removable storage media implemented in any method or technology for storage of information such as processor-readable instructions, data structures, program modules, or other data. Tangible processor-readable storage media includes but is not limited to RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 500. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Clause 1. A method of routing a transmission packet along a route from a source to a destination, comprising: accessing routing metadata in a wrapper of the transmission packet, the routing metadata representing a feature of the source or the destination; comparing the routing metadata to routing policy data associated with each of multiple routing policies defined within a routing policy structure; identifying, based on the comparing, one or more routing policies applicable to the transmission packet; identifying, based on the routing policy data, a highest priority routing policy from the one or more routing policies, the highest priority routing policy defining a route constraint usable to limit a selection of available routes to the destination; and selecting the route from the available routes based on the route constraint.

Clause 2. The method of clause 1, wherein the transmission packet includes a header and a payload, and wherein the wrapper includes information external to the transmission packet.

Clause 3. The method of clause 1, wherein the route constraint defines at least one of a source interface, a source internet protocol (IP) address, and a next hop address of the route, and wherein selecting the route comprises selecting the source interface, the source Internet protocol (IP) address, or the next hop address of the route.

Clause 4. The method of clause 1, wherein the routing metadata includes at least one of a hostname of the destination, a process identifier of a process associated with the transmission packet, a user identifier of a user associated with the transmission packet, or a compartment identifier of a namespace from which the transmission packet is sourced.

Clause 5. The method of clause 1, further comprising: identifying a policy inspection point in a routing pipeline through which outgoing packets are routed, wherein the accessing of the routing metadata is conducted in response to identifying the policy inspection point.

Clause 6. The method of clause 5, wherein the policy inspection point is located within at least one of an application layer enforcement shim, a portion of the routing pipeline within a transport layer, or a portion of the routing pipeline within a network layer.

Clause 7. The method of clause 1, further comprising: removing the wrapper from the transmission packet; and transmitting the transmission packet along the route with the wrapper removed.

Clause 8. A system for routing a transmission packet along a route from a source to a destination, comprising: one or more hardware processors; a routing metadata extractor executable by the one or more hardware processors and configured to extract routing metadata from a wrapper of the transmission packet, the routing metadata representing a feature of the source or the destination; a routing policy manager executable by the one or more hardware processors and configured to: compare the routing metadata to routing policy data associated with each of multiple routing policies defined within a routing policy structure; identify, based on the comparison, one or more routing policies applicable to the transmission packet; and identify, based on the routing policy data, a highest priority routing policy from the one or more routing policies, the highest priority routing policy defining a route constraint usable to limit a selection of available routes to the destination; and a routing manager executable by the one or more hardware processors and configured to select the route from the available routes based on the route constraint.

Clause 9. The system of clause 8, wherein the wrapper encompasses a header and a payload of the transmission packet.

Clause 10. The system of clause 8, wherein the route constraint defines at least one of a source interface, a source internet protocol (IP) address, and a next hop address of the route, and wherein the routing manager selects the route from the available routes by selecting the source interface, the source Internet protocol (IP) address, or the next hop address of the route.

Clause 11. The system of clause 8, wherein the routing metadata includes at least one of a hostname of the destination, a process identifier of a process associated with the transmission packet, a user identifier of a user associated with the transmission packet, or a compartment identifier of a namespace from which the transmission packet is sourced.

Clause 12. The system of clause 8, wherein the routing policy manager is further configured to: identify a policy inspection point in a routing pipeline through which outgoing packets are routed, wherein the routing metadata extractor is configured to extract the routing metadata responsive to the identification of the policy inspection point.

Clause 13. The system of clause 12, wherein the policy inspection point is located within at least one of an application layer enforcement shim, a portion of the routing pipeline within a transport layer, or a portion of the routing pipeline within a network layer.

Clause 14. The system of clause 8, further comprising: a wrapper remover executable by the one or more hardware processors and configured to remove, responsive to the selecting, the wrapper from the transmission packet; and a hardware network interface configured to transmit the transmission packet along the route with the wrapper removed.

Clause 15. One or more tangible processor-readable storage media embodied with instructions for executing on one or more processors and circuits of a computing device a process of routing a transmission packet along a route from a source to a destination, the process comprising: accessing routing metadata in a wrapper of the transmission packet, the routing metadata being excluded from a header of the transmission packet and representing a feature of the source or the destination; comparing the routing metadata to routing policy data associated with each of multiple routing policies defined within a routing policy structure; identifying, based on the comparing, one or more routing policies applicable to the transmission packet; identifying, based on the routing policy data, a highest priority routing policy from the one or more routing policies, the highest priority routing policy defining a route constraint usable to limit a selection of available routes to the destination; and selecting the route from the available routes based on the route constraint.

Clause 16. The one or more tangible processor-readable storage media of clause 15, wherein the route constraint defines at least one of a source interface, a source internet protocol (IP) address, and a next hop address of the route, and wherein selecting the route comprises selecting the source interface, the source Internet protocol (IP) address, or the next hop address of the route.

Clause 17. The one or more tangible processor-readable storage media of clause 15, wherein the routing metadata includes at least one of a hostname of the destination, a process identifier of a process associated with the transmission packet, a user identifier of a user associated with the transmission packet, or a compartment identifier of a namespace from which the transmission packet is sourced.

Clause 18. The one or more tangible processor-readable storage media of clause 15, the process further comprising: identifying a policy inspection point in a routing pipeline through which outgoing packets are routed, wherein the accessing is conducted responsive to identification of the policy inspection point.

Clause 19. The one or more tangible processor-readable storage media of clause 18, wherein the inspection point is located within at least one of an application layer enforcement shim, a portion of the routing pipeline within a transport layer, or a portion of the routing pipeline within a network layer.

Clause 20. The one or more tangible processor-readable storage media of clause 15, the process further comprising: removing, responsive to the selecting of the route, the wrapper from the transmission packet; and transmitting the transmission packet along the route with the wrapper removed.

An example system for routing a transmission packet along a route from a source to a destination is provided, comprising: means for accessing routing metadata in a wrapper of the transmission packet, the routing metadata representing a feature of the source or the destination; means for comparing the routing metadata to routing policy data associated with each of multiple routing policies defined within a routing policy structure; means for identifying, based on the comparison, one or more routing policies applicable to the transmission packet; means for identifying, based on the routing policy data, a highest priority routing policy from the one or more routing policies, the highest priority routing policy defining a route constraint usable to limit a selection of available routes to the destination; and means for selecting the route from the available routes based on the route constraint.

Another example system of any disclosed system is provided, wherein the transmission packet includes a header and a payload, and wherein the wrapper includes information external to the transmission packet.

Another example system of any disclosed system is provided, wherein the route constraint defines at least one of a source interface, a source internet protocol (IP) address, and a next hop address of the route, and wherein means for selecting the route comprises means for selecting the source interface, the source Internet protocol (IP) address, or the next hop address of the route.

Another example system of any disclosed system is provided, wherein the routing metadata includes at least one of a hostname of the destination, a process identifier of a process associated with the transmission packet, a user identifier of a user associated with the transmission packet, or a compartment identifier of a namespace from which the transmission packet is sourced.

Another example system of any disclosed system is provided, further comprising: means for identifying a policy inspection point in a routing pipeline through which outgoing packets are routed, wherein the means for accessing the routing metadata accesses the routed metadata in response to means for identifying the policy inspection point identifying the policy inspection point.

Another example system of any disclosed system is provided, wherein the policy inspection point is located within at least one of an application layer enforcement shim, a portion of the routing pipeline within a transport layer, or a portion of the routing pipeline within a network layer.

Another example system of any disclosed system is provided, further comprising: means for removing the wrapper from the transmission packet; and means for transmitting the transmission packet along the route with the wrapper removed.

Some implementations may comprise an article of manufacture, which excludes software per se. An article of manufacture may comprise a tangible storage medium to store logic and/or data. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein may be implemented as logical steps in one or more computer systems. The logical operations may be implemented (1) as a sequence of processor-implemented steps executing in one or more computer systems or (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order unless explicitly claimed otherwise or a specific order is inherently necessitated by the claim language.

While this specification contains many specific implementation details, these should not be construed as limitations on the scope of any technologies or of what may be claimed but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination. Other implementations are within the scope of the following claims. Nevertheless, it will be understood that various modifications can be made without departing from the spirit and scope of the recited claims.

What is claimed is:

1. A method of routing a transmission packet along a route from a source to a destination, comprising:
    accessing routing metadata in a wrapper of the transmission packet, the routing metadata representing a feature of the source or the destination;
    comparing the routing metadata to routing policy data associated with each of multiple routing policies defined within a routing policy structure;
    identifying, based on the comparing, one or more routing policies applicable to the transmission packet;
    identifying, based on the routing policy data, a highest priority routing policy from the one or more routing policies, the highest priority routing policy defining a route constraint usable to limit a selection of available routes to the destination;
    selecting the route from the available routes based on the route constraint;
    removing the wrapper from the transmission packet; and
    transmitting the transmission packet along the route from the source to the destination with the wrapper removed.

2. The method of claim 1, wherein the transmission packet includes a header and a payload.

3. The method of claim 1, wherein the route constraint defines at least one of a source interface, a source internet protocol (IP) address, and a next hop address of the route, and wherein selecting the route comprises selecting the source interface, the source Internet protocol (IP) address, or the next hop address of the route.

4. The method of claim 1, wherein the routing metadata includes at least one of a hostname of the destination, a process identifier of a process associated with the transmission packet, a user identifier of a user associated with the transmission packet, or a compartment identifier of a namespace from which the transmission packet is sourced.

5. The method of claim 1, further comprising:
    identifying a policy inspection point in a routing pipeline through which outgoing packets are routed, wherein the accessing of the routing metadata is conducted in response to identifying the policy inspection point.

6. The method of claim 5, wherein the policy inspection point is located within at least one of an application layer enforcement shim, a portion of the routing pipeline within a transport layer, or a portion of the routing pipeline within a network layer.

7. A system for routing a transmission packet along a route from a source to a destination, comprising:
    one or more hardware processors;
    a routing metadata extractor executable by the one or more hardware processors and configured to extract routing metadata from a wrapper of the transmission packet, the routing metadata representing a feature of the source or the destination;
    a routing policy manager executable by the one or more hardware processors and configured to:
        compare the routing metadata to routing policy data associated with each of multiple routing policies defined within a routing policy structure;
        identify, based on the comparison, one or more routing policies applicable to the transmission packet; and
        identify, based on the routing policy data, a highest priority routing policy from the one or more routing policies, the highest priority routing policy defining a route constraint usable to limit a selection of available routes to the destination; and
    select the route from the available routes based on the route constraint; and
    a wrapper remover executable by the one or more hardware processors and configured to remove the wrapper from the transmission packet; and
    a hardware network interface configured to transmit the transmission packet along the route from the source to the destination with the wrapper removed.

8. The system of claim 7, wherein the wrapper encompasses a header and a payload of the transmission packet.

9. The system of claim 7, wherein the route constraint defines at least one of a source interface, a source internet protocol (IP) address, and a next hop address of the route, and wherein selecting the route from the available routes includes selecting the source interface, the source Internet protocol (IP) address, or the next hop address of the route.

10. The system of claim 7, wherein the routing metadata includes at least one of a hostname of the destination, a process identifier of a process associated with the transmission packet, a user identifier of a user associated with the transmission packet, or a compartment identifier of a namespace from which the transmission packet is sourced.

11. The system of claim 7, wherein the routing policy manager is further configured to:
    identify a policy inspection point in a routing pipeline through which outgoing packets are routed, wherein the routing metadata extractor is configured to extract the routing metadata responsive to the identification of the policy inspection point.

12. The system of claim 11, wherein the policy inspection point is located within at least one of an application layer enforcement shim, a portion of the routing pipeline within a transport layer, or a portion of the routing pipeline within a network layer.

13. One or more tangible processor-readable storage media embodied with instructions for executing on one or more processors and circuits of a computing device a process of routing a transmission packet along a route from a source to a destination, the process comprising:
    accessing routing metadata in a wrapper of the transmission packet, the routing metadata being excluded from a header of the transmission packet and representing a feature of the source or the destination;
    comparing the routing metadata to routing policy data associated with each of multiple routing policies defined within a routing policy structure;
    identifying, based on the comparing, one or more routing policies applicable to the transmission packet;
    identifying, based on the routing policy data, a highest priority routing policy from the one or more routing policies, the highest priority routing policy defining a route constraint usable to limit a selection of available routes to the destination;
    selecting the route from the available routes based on the route constraint;

removing the wrapper from the transmission packet; and transmitting the transmission packet along the route from the source to the destination with the wrapper removed.

14. The one or more tangible processor-readable storage media of claim 13, wherein the route constraint defines at least one of a source interface, a source internet protocol (IP) address, and a next hop address of the route, and wherein selecting the route comprises selecting the source interface, the source Internet protocol (IP) address, or the next hop address of the route.

15. The one or more tangible processor-readable storage media of claim 13, wherein the routing metadata includes at least one of a hostname of the destination, a process identifier of a process associated with the transmission packet, a user identifier of a user associated with the transmission packet, or a compartment identifier of a namespace from which the transmission packet is sourced.

16. The one or more tangible processor-readable storage media of claim 13, the process further comprising:

identifying a policy inspection point in a routing pipeline through which outgoing packets are routed, wherein the accessing is conducted responsive to identification of the policy inspection point.

17. The one or more tangible processor-readable storage media of claim 16, wherein the policy inspection point is located within at least one of an application layer enforcement shim, a portion of the routing pipeline within a transport layer, or a portion of the routing pipeline within a network layer.

* * * * *